United States Patent
Liu

(10) Patent No.: US 9,749,207 B2
(45) Date of Patent: Aug. 29, 2017

(54) METHODS FOR MEASURING PHYSICAL CPU UTILIZATION IN A CLOUD COMPUTING INFRASTRUCTURE

(71) Applicant: Accenture Global Services Limited, Dublin (IE)

(72) Inventor: Huan Liu, Sunnyvale, CA (US)

(73) Assignee: ACCENTURE GLOBAL SERVICES LIMITED, Dublin (IE)

(*) Notice: Subject to any disclaimer, the term of this patent is extended or adjusted under 35 U.S.C. 154(b) by 381 days.

(21) Appl. No.: 14/283,501

(22) Filed: May 21, 2014

(65) Prior Publication Data

US 2014/0258519 A1    Sep. 11, 2014

Related U.S. Application Data

(63) Continuation of application No. 13/240,831, filed on Sep. 22, 2011, now Pat. No. 8,769,534.

(60) Provisional application No. 61/385,829, filed on Sep. 23, 2010.

(51) Int. Cl.
| | |
|---|---|
| *G06F 9/455* | (2006.01) |
| *H04L 12/26* | (2006.01) |
| *G06F 11/34* | (2006.01) |
| *H04L 12/911* | (2013.01) |

(52) U.S. Cl.
CPC ...... *H04L 43/0876* (2013.01); *G06F 11/3409* (2013.01); *G06F 11/3466* (2013.01); *H04L 47/70* (2013.01); *G06F 2201/815* (2013.01)

(58) Field of Classification Search
CPC .. H04L 43/0876; H04L 47/70; G06F 11/3409; G06F 11/3466; G06F 2201/815
See application file for complete search history.

(56) References Cited

U.S. PATENT DOCUMENTS

| | | | |
|---|---|---|---|
| 6,490,727 B1 | 12/2002 | Nazarathy | |
| 8,175,863 B1* | 5/2012 | Ostermeyer | G06F 17/5009 703/13 |
| 2004/0059956 A1 | 3/2004 | Chakravarthy | |
| 2005/0086401 A1 | 4/2005 | Connor | |
| 2006/0095913 A1* | 5/2006 | Bodas | G06F 9/5027 718/100 |
| 2006/0136074 A1 | 6/2006 | Arai | |
| 2009/0025006 A1 | 1/2009 | Waldspurger | |
| 2009/0138228 A1 | 5/2009 | Dalton | |
| 2009/0172357 A1 | 7/2009 | Puthiyedath | |
| 2009/0249333 A1* | 10/2009 | Yamaguchi | G06F 9/455 718/1 |
| 2009/0300173 A1 | 12/2009 | Bakman | |

(Continued)

OTHER PUBLICATIONS

Brann Mitchell, Smooth Creations Neptune Xtreme Machine, Mar. 31, 2009, guru3d.com/articles_pages/smoothcreations_neptune_xtreme_machine, 1 O.html, 4 pages.

*Primary Examiner* — James J Lee
(74) *Attorney, Agent, or Firm* — Fish & Richardson P.C.

(57) ABSTRACT

Novel techniques are provided to determine concurrent hardware resource usage as expressed in activity performed by hardware processors. A cloud computing consumer can verify the level of the quality of service provided by the physical infrastructure of a cloud, thereby allowing the consumer the ability to request a transfer of the hosting physical infrastructure to a less burdened physical machine.

52 Claims, 4 Drawing Sheets

(56) References Cited

U.S. PATENT DOCUMENTS

| | | |
|---|---|---|
| 2010/0005465 A1* | 1/2010 | Kawato .................. G06F 9/455 |
| | | 718/1 |
| 2010/0102949 A1 | 4/2010 | Rotem |
| 2010/0115514 A1* | 5/2010 | Maliszewski ....... G06F 9/45537 |
| | | 718/1 |
| 2010/0223378 A1 | 9/2010 | Wei |
| 2010/0274890 A1 | 10/2010 | Patel |
| 2010/0318990 A1 | 12/2010 | Hou |
| 2010/0332657 A1* | 12/2010 | Elyashev ............ H04L 67/1002 |
| | | 709/226 |
| 2011/0029969 A1 | 2/2011 | Venkataraja |
| 2011/0138395 A1 | 6/2011 | Wolfe |
| 2011/0185064 A1 | 7/2011 | Head |
| 2011/0191776 A1* | 8/2011 | Bose ........................ G06F 9/46 |
| | | 718/102 |

* cited by examiner

Exemplary Computer System 400

METHODS FOR MEASURING PHYSICAL CPU UTILIZATION IN A CLOUD COMPUTING INFRASTRUCTURE

CLAIM OF PRIORITY

This application is a continuation application of and claims priority to U.S. application Ser. No. 13/240,831, filed on Sep. 22, 2011, which claims priority to U.S. Provisional Patent Application Ser. No.: 61/385,829, filed Sep. 23, 2010, which is incorporated by reference herein in its entirety.

BACKGROUND

Cloud computing provides computation, capacity, and storage on demand. Typical cloud computing service agreements are based on a self-service usage model which allows a virtually unlimited amount of computing resources to be dynamically requisitioned, on demand, from a pool of shared computing resources offered by a cloud computing vendor.

In typical cloud computing operations, several virtual machines (VMs) will be hosted from each one of many physical hardware infrastructure resources (e.g., server). Multiple physical resources can thus provide the platform with which to virtualize an entire host of virtual machines conceptually and operationally independent from each other. Individual consumers of cloud computing services may lease the processing and storage services of one or more virtual machines, distributed among one or more physical infrastructure resources in a cloud data center. Although this model provides quick and often cheaper access to the resources relative to traditional hardware procurement and configuration, it also presents significant problems for resource management. Paramount among these problems includes a lack of control of, and visibility into, resource configuration and usage.

For example, a typical cloud component featuring virtual machines may offer limited types of virtual servers, and consumers of cloud computing services—that is, the application owners—will not be able to select or customize the specifications of the leased servers. In addition, the application owners have little or no control of or visibility into the underlying physical infrastructure as well.

One of the purported benefits of moving an application to a public cloud is that it cloud computing is more environmentally friendly than standard enterprise data centers. These benefits are theoretically possible because the cloud servers have a higher-utilization rates (due to the non-proportional energy consumption of modem servers), and cloud data centers typically operate more efficiently than their standard physical counterparts. Because modem servers do not generally consume energy proportional to their utilization (for example, an idle server could still consume around 60% of the energy consumed during heavy activity), a higher utilization directly translates into lower energy consumption and thus, smaller environmental impact. Since the incremental energy consumption is relatively small for additional loads, it is beneficial to increase the server utilization as much as possible.

Beyond the benefits to the environment, increasing utilization may also carry a significant financial benefit. A large data center—such as that operated by a cloud—may require many megawatts of electricity, and even a small percentage improvement in efficiency could translate into a large cost savings for its operators. Moreover, a cloud can run its data center facility more efficiently. This is both due to its scale and due to the fact that operating a data center is its core competence. For example, a cloud data center could have a more optimized rack space layout, a more streamlined cooling airflow, and a more efficient air conditioning system.

While in the aggregate each of these propositions may be true, for individual cloud computing clients however, any such purported benefits may be offset by sharing physical resources with anonymous fellow consumers who may consume or require a disproportionately greater share of the underlying physical infrastructure. If this behavior becomes routine or frequent, a cloud computing consumer paying for service from a virtual machine hosted on the same physical infrastructure may have its services severely and negatively impacted. However, due to the lack of visibility and accessibility into the underlying cloud infrastructure, the exact source of the problem may be tremendously difficult to diagnose with any degree of accuracy.

SUMMARY

As a solution to the problems noted above, this claimed subject matter provides novel techniques to determine concurrent hardware resource usage in a cloud infrastructure (or any other computing infrastructure where visibility is restricted or limited) as expressed in activity performed by hardware processors (e.g., the central processing unit or CPU).

In an embodiment, a method is provided to determine the amount of CPU utilization of a physical machine in a cloud (or visibility-limited) data center hosting a virtual machine (VM) of a consumer by counting the number of unhalted CPU cycles during a designated or target duration of time.

In a second embodiment, a method is provided to determine the amount of CPU utilization of a physical machine in a cloud data center hosting a VM of a consumer by determining the temperature of the CPU during a designated or target duration of time based on the correlation between CPU temperature and usage.

In yet a further embodiment, a method is provided to determine the amount of CPU utilization of a physical machine in a cloud data center hosting a VM of a consumer by artificially bursting (i.e., maximizing) the resources demanded by a consumer's application for as long as possible, to determine the usage requirements of other cloud consumers on the same physical infrastructure component.

By determining the CPU utilization from each of these methods, a consumer is able to determine if executing the consumer's application on another VM hosted on another physical resource elsewhere in the cloud data center may be preferred to ensure high quality of service.

BRIEF DESCRIPTION OF THE DRAWINGS

The accompanying drawings, which are incorporated in and form a part of this specification, illustrate embodiments of the disclosure and, together with the description, serve to explain the principles of the presently claimed subject matter:

DETAILED DESCRIPTION

Figure 1:
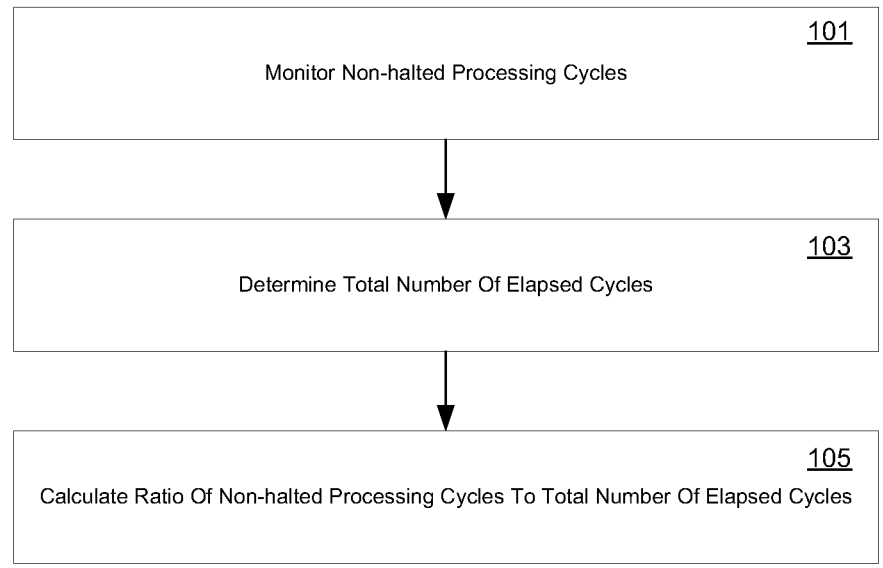
FIG. 1 depicts an example flowchart of a process for indirectly calculating CPU utilization from monitoring unhalted cycles in the CPU, in accordance with embodiments of the present disclosure.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known processes, procedures, components, and circuits have not been described in detail as not to unnecessarily obscure aspects and features of the subject matter.

Portions of the detailed description that follow are presented and discussed in terms of a process. Although operations and sequencing thereof are disclosed in a figure herein (e.g., FIG. 1, 2, 3) describing the operations of this process, such operations and sequencing are exemplary. Embodiments are well suited to performing various other operations or variations of the operations recited in the flowchart of the figure herein, and in a sequence other than that depicted and described herein.

Some portions of the detailed description are presented in terms of procedures, operations, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed operation, logic block, process, etc., is here, and generally, conceived to be a self-consistent sequence of operations or instructions leading to a desired result. The operations are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

While the following example configurations are shown as incorporating specific, enumerated features and elements, it is understood that such depiction is exemplary. Accordingly, embodiments are well suited to applications involving different, additional, or fewer elements, features, or arrangements.

According to embodiments of the presently claimed subject matter, three Different techniques are described herein which may be used to measure the utilization of a physical computing device without directly accessing the usage monitor of the device. In an embodiment, the physical computing device is a server, and the utilization is measured by determine the utilization of the device's central processing unit (CPU). These techniques may be performed by, for example, a cloud computing client (user) to determine the utilization of a particular hardware resource in a cloud computing infrastructure. Alternatively, the techniques may be performed by a client remotely and/or restricted from directly accessing a usage monitor or other reporting method provided by the physical hardware device and/or component.

Under these techniques, one or more virtual machines are provisioned in a cloud provider. Subsequently, from within the VM, the CPU utilization is monitored by measuring the collective CPU utilization of other VMs sitting on the same hardware. In an embodiment, a virtual machine provided with the least amount of resources available from a cloud computing provider is provisioned for this task. Though theoretically a VM of any size may be used, a VM with less processing and storage requirements will take a less amount of capacity away from the target physical machine, and allows the physical device to retain the ability to host as many other VMs as possible.

According to various embodiments, the processes described below with reference to flowcharts 100, 200, and 300 may be performed in a (dynamically) provisioned virtualized computing system hosted by a physical resource (such as a server). In further embodiments, the physical resource comprises but one component in a cloud data network. In alternate embodiments, the CPU may be comprised in a physical hardware device remotely located from a user and accessed via an instance of a virtual machine executed on the hardware device through a virtual private network (VPN), for example. According to these embodiments, the user may be prohibited from accessing CPU usage monitors directly (e.g., by user access controls executed on the physical hardware device).

Measuring by Hardware Performance Counter

The central processing units (CPUs) of modern computing devices often feature a set of hardware performance counters implemented as CPU registers. These registers are designed to facilitate software programs to measure performance events in order to debug problems or optimize program code. These hardware performance counters could be programmed to monitor a number of events, such as the number of cache misses, the number of branch mis-predictions, instruction counts, etc. According to an embodiment, these hardware performance counters are programmed to execute a method for indirectly calculating CPU utilization.

With reference to FIG. 1, an example flowchart 100 of a process for indirectly calculating CPU utilization from monitoring unhalted cycles in the CPU is depicted, in accordance with various embodiments of the present claimed subject matter. Steps 101-105 describe example steps of the flowchart 100 in accordance with the various embodiments herein described.

At step 101, the CPU is monitored for a period of time to detect the presence and (if applicable) number of non-halted processing cycles. Current operating systems put the processor into the halt state whenever there are no immediate processing tasks to perform. By counting the number of unhalted cycles, the exact number of cycles the CPU is in an active state for a period of time may be determined. Monitoring the CPU for the presence of non-halted processing cycles may be performed by, for example, programming the hardware performance counters via the provisioned virtual machine to recognize, as an event, the non-halted processing cycles. A counter can be further implemented in the register to count the number of non-halted processing cycles of a CPU for a pre-determined period of time. At step 103, the total number of elapsed processing cycles for the same pre-determined period of time is calculated. The total number of elapsed processing cycles may be calculated by implementing a timestamp counter, which counts the total number of cycles that have passed, including the time the CPU spent in the halt state. Subsequently, at step 105, CPU utilization may be derived by taking the ratio between the two values, e.g., the number of unhalted cycles and the total number of elapsed cycles.

According to an embodiment, CPU utilization may be determined as a percentage, e.g., the percentage of unhalted (or halted) cycles over the total number of elapsed processing cycles. Because halted cycles directly correspond to idleness of the processor, by determining the proportion of halted cycles in an elapsed period of time, the general utilization of the processor can be thus determined. For example, a high ratio of halted cycles (or low ratio of unhalted cycles) over elapsed time (high approaching a 1:1 ratio, for example), indicates that the processor is generally or wholly idle (unused). Conversely, a low ratio of halted cycles (or high ratio of unhalted cycles) over elapsed time (low approaching a 0:1 ratio, for example), indicates that the processor is generally continuously active, and may be occupied by at least one other virtual machine performing resource consumptive and/or intensive tasks.

On some hardware platforms, the performance counters are programmed through model specific registers. The instructions to program and read these registers are privileged, so a hypervisor (a Virtual Machine monitor) would trap the instructions and subsequently decide to allow, emulate or disallow them. According to these configurations, a kernel driver which can program and read the performance counters may be launched from the provisioned virtual machine. A user may then access the kernel driver periodically (e.g., through a user interface communicatively coupled to the virtual machine) to read the latest performance count and determine the CPU utilization.

Measuring by CPU Temperature

Not every cloud computing vendor allows programming of hardware performance counter, however. The hypervisors of the VMs from these vendors may intercept the programming instructions or simply ignore them altogether. According to a second embodiment, CPU utilization can be determined based on the detected temperature of the CPU. This approach is based on the principle that the temperature produced by a CPU chip rises when the processor is used. Conversely, when the CPU is idle, little heat is generated and as a result, the temperature produced by the chip lowers.

Figure 2:
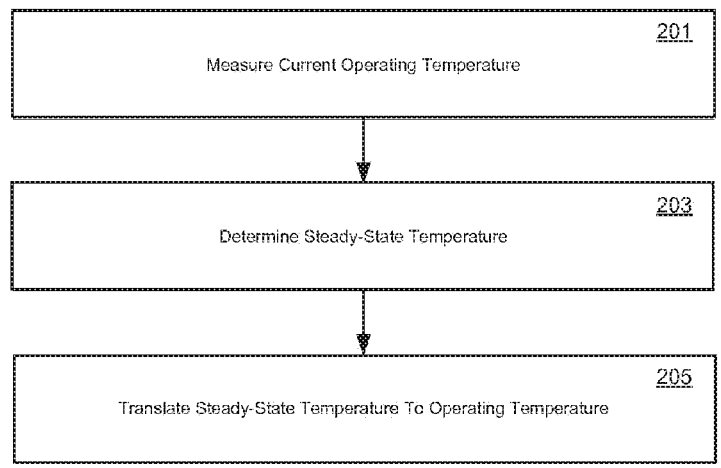
FIG. 2 depicts an example flowchart of a process for indirectly calculating CPU utilization from fluctuation in the temperature produced by the CPU is depicted, in accordance with embodiments of the present disclosure.

With reference to FIG. 2, an example flowchart 200 of a process for indirectly calculating CPU utilization from fluctuation in the temperature produced by the CPU is depicted, in accordance with various embodiments of the present claimed subject matter. Steps 201-205 describe example steps of the flowchart 200 in accordance with the various embodiments herein described.

At step 201, the current operating temperature of the CPU is determined. Modem CPUs often include a plurality of processing "cores," and have an embedded thermal diode at the hottest spot of each CPU core. According to these embodiments, the corresponding temperature of a CPU core may be read through a special processor model-specific register. In some instances, the temperature reported by a CPU is a relative temperature expressed as the difference between the current temperature and the critical shutdown temperature (the temperature where the processor shuts down to avoid being damaged due to excessively high temperatures). Thus, the temperature value decreases as the chip gets hotter (i.e., the difference between the current operating temperature and the critical shutdown temperature reduces). At a reading of 0, the chip would automatically shutdown to protect the chip. According to further embodiments, the temperature has a reading resolution of one Celsius degree.

According to some embodiments, the instruction to read the thermal diode may be a privileged instruction (i.e., not directly accessible to a virtual machine), a kernel driver may be implemented which not only reads the temperature, but also reads the advanced programmable interrupt controller identification ("APIC ID") by running a processor supplementary instruction—such as a central processing unit ID ("CPUID") instruction. The APIC ID uniquely identifies a particular core of the CPU; thus, the temperature reading may be attributed to the exact core used to perform processing for the virtualized machine. From a user interface of the virtualized machine, the kernel driver may be periodically called to sample the temperature reading. Under some hypervisors, a virtual core is not fixed to a physical core, and it could be scheduled to any physical core by random assignment. According to these embodiments, the temperature diode may be read on all physical cores by repeatedly sampling the temperature reading, and using the average temperature reading as the temperature of the processor.

Since a small (less resource intensive) VM used in a cloud data infrastructure has a smaller number of virtual cores (e.g., one or two) than the number of physical cores, in an embodiment, the temperature may be sampled at a higher frequency (e.g., every 100 ms) so that each physical core may be read from at least once a second. In instances where readings each second may not be possible, previous recorded samples from the most recent past may be used instead as an approximation.

At step 203, the steady-state temperature is determined. In an embodiment, to determine the steady-state temperature, a constant load is placed in the VM, then, after a pre-determined period of time, the temperature sensor may be queried. In a further embodiment, a workload generator may be used to generate a constant load at a desired amount of CPU utilization.

Once a sample of the current CPU temperature is obtained at step 201, and the steady-state temperature of the CPU temperature is determined at step 203, the temperature may be translated to the actual CPU utilization at step 205. The energy (e.g., heat) produced by a CPU is proportional to the utilization level, and increases in the utilization level of a CPU causes a linear increase in the temperature that may be expressed as $$dT = c_1 U dt \qquad (1)$$

where $c_1$ is a constant, U is the CPU utilization, T is the temperature and t is a measure of time.

When a CPU is idle, it typically consumes a non-negligible amount of power. To simplify the presentation however, the constant is assumed to be zero, although a non-zero constant would not affect the derivation.

The differential between the CPU temperature and the ambient temperature causes the chip to cool down. The decrease in temperature is linear to the temperature differential.

$$dT = -c_2(T - T_0)dt \qquad (2)$$

where $c_2$ is a constant.

Combining the two equations, the net temperature fluctuation may be expressed as:

$$dT = [c_1 U - c_2(T - T_0)]dt \qquad (3)$$

The chip temperature may be thus expressed as a function of time equal to:

$$T(t) = -\frac{c_0}{c_2} e^{-c_2 t} + \frac{c_1}{c_2} U + T_0 \qquad (4)$$

The equation above has a dynamic and static component. The static component $$\frac{c_1}{c_2} U + T_0$$

predicts a steady-state temperature of the CPU if the CPU is at a certain utilization U for a long period of time. The dynamic component $$-\frac{c_0}{c_2} e^{-c_2 t}$$

predicts that the temperature increases or decreases (when going from a high utilization to a low utilization) gradually until it reaches the steady-state temperature. The increase or decrease is an exponential function of time.

Due to thermal conservation, the heat generated must be the same as the heat dissipated. The conservation may not hold over a shorter period since the heat sink can trap heat; however, over a longer period of time, or for a period where the heat sink's temperature remains the same from the beginning to the end, thermal conservation holds. Combining equation (1) and equation (2) gives the equation:

$$\int c_1 U dt = \int c_2(T - T_0) dt \qquad (5)$$

Dividing both sides by the time interval and the constant c1 provides:

$$\overline{U} = \frac{1}{c_1/c_2}(\overline{T} - T_0) \qquad (6)$$

Which states that the average utilization $\overline{U}$ is a linear function of the average temperature $\overline{T}$. The two constants $c_1/c_2$ and $T_0$ can be readily estimated from equation (4). Equation (4) predicts that the steady-state temperature is linear to the load (i.e., the utilization U).

The constants $c_1/c_2$ and $T_0$ are a function of a number of independent variables, including the heat sink (material and placement), the fans (placement and speed), the ambient temperature etc. Because these variables vary from one hardware box to another, and vary from one rack location to another, the constants vary from hardware to hardware too. As a result, according to an embodiment, after a VM is provisioned and after monitoring of the underlying hardware's CPU utilization is performed, a characterization phase may be initiated. In this phase, a utilization load is progressively increased, then after a slight delay (e.g., a few minutes), the CPU temperature sensor is read. After a number of utilization and steady-state temperature pairs are collected, a least-square line fitting may be used to estimate the two constants $-c_1/c_2$ and $T_0$, which subsequently may be used to infer the CPU utilization.

During the characterization phase, the underlying CPU may not be idle, since other VMs may be actively using the CPU. Except when idle or when fully loaded, a CPU typically has to alternate between fully loaded and fully idle at any instant of time. The average of the busy and idle cycles thus determines the average utilization. Thus, the CPU temperature fluctuates when the CPU is at a partial utilization. Whether the CPU is idle may be evident from the CPU temperature fluctuation. In addition, the lower temperature recorded during the temperature sampling may be used as a validation to verify operation in an idle period. If no idle period is detected, the characterization phase may be repeated.

Balloon Measuring

Program counting methods and CPU temperature methods both require running a privileged instruction on the underlying physical infrastructure component. However, not all hypervisors allow these privileged instructions. According to a third embodiment, CPU utilization may be estimated without the usage of privileged instructions by executing a bursting application in a provisioned virtual machine. According to an embodiment, service agreements between a cloud service provider and a client may include limitations in consumption of physical resources allocated to a provisioned virtual machine. These service agreements may vary by class, thus, certain virtual machines may have smaller resource allocations than other, progressively costlier virtual machines. Bursting is a feature that allows a virtual machine to exceed its agreed-upon maximum allocation of physical resources to the extent that physical resources are available and not in use by other co-consumers. This technique exploits the fact that the hypervisor allocates the physical CPU resource proportionally among the virtual machines according to the particular service agreement or class/type of virtual machine.

Figure 3:
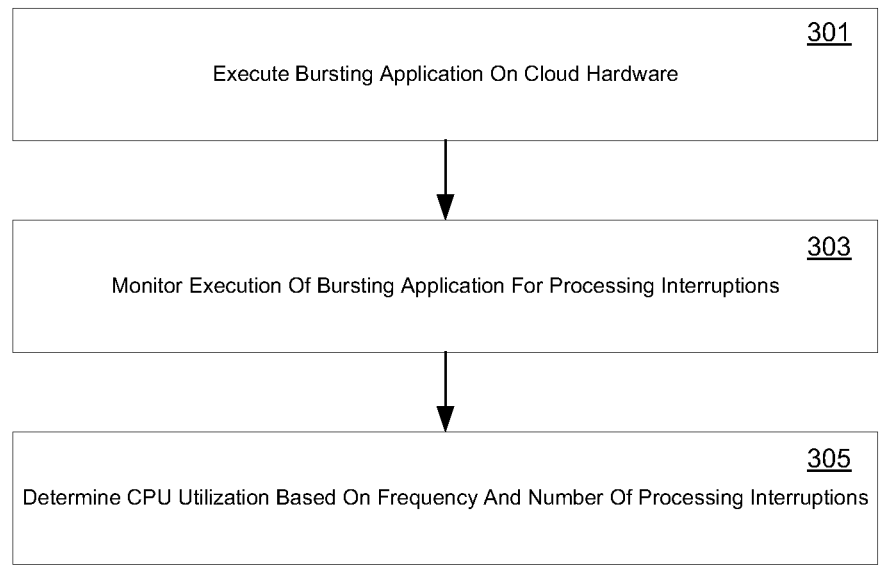
FIG. 3 depicts an example flowchart of a process for indirectly calculating CPU utilization from detected processing interruptions in a bursting application, in accordance with embodiments of the present disclosure.

With reference to FIG. 3, an example flowchart 300 of a process for indirectly calculating CPU utilization from detected processing interruptions in a bursting application is depicted, in accordance with various embodiments of the present claimed subject matter. Steps 301-305 describe example steps of the flowchart 300 in accordance with the various embodiments herein described.

To measure the CPU utilization caused by other VMs, the CPU of the physical hardware resource corresponding to a provisioned VM may be artificially kept as busy as possible by executing a bursting application at step 301. Subsequently, the execution of the bursting application is monitored at step 303 for processing interruptions incurred over a pre-determined period of time. Once the number of diversions (or processing interruptions) is determined at step 303, the utilization of the CPU may be inferred at step 305 by measuring the amount of physical CPU processing time for the provisioned VM that is diverted (e.g., allocated to perform other tasks) during the pre-determined period of time. Since the physical CPU time is constantly being requested by the provisioned VM by the bursting application, any CPU time not used to perform processing for the requisitioned VM must naturally be diverted and used to perform processing for other VMs that are demanding the physical CPU.

There are two ways to measure the diverted CPU time. Certain hypervisors provide guest application programming interfaces ("APIs") which allow a provisioned VM to make programmed calls to the API to inquire about statuses from the underlying hypervisor. According to an embodiment, one of the API calls may be used to retrieve the diverted CPU cycles. Alternatively, the same information can also be obtained in another embodiment by calling an API which reports the amount of CPU (in terms of CPU cycles) used by the VM, and subtract it from the elapsed time. In yet another embodiment, the amount of CPU demanded by other VMs may be determined by periodically requesting the amount of CPU used by the VM, subtracting the sample by the result reported at the last sample, and then dividing by the time period (e.g., unit or duration of time) to determine the CPU utilization diverted to perform other processing tasks (e.g., for other virtualized machines).

In alternate embodiments, a kernel driver, which is called by a user level program periodically, may be used. In further embodiments, a programmed loop is executed within the kernel driver which continuously monitors a hardware timestamp counter comprised in the registers of the CPU. If the time difference between two samples of the timestamp is more than the normal time taken for the programmed loop, the interruption is attributed to the hypervisor, and any resulting the extra time may be attributed to the other VMs. The kernel driver sits in the programmed loop for the sampling period (e.g., for one second), then it returns back to the user space program.

By using any of the methods provided above, a cloud computing consumer can verify the level of the quality of service provided by the physical infrastructure of a cloud, thereby providing the consumer with the information to reliably and accurately determine whether a transfer of the hosting physical infrastructure to a less burdened physical machine may be necessary according to the consumer's operating needs.

Example Computing Device

Figure 4:
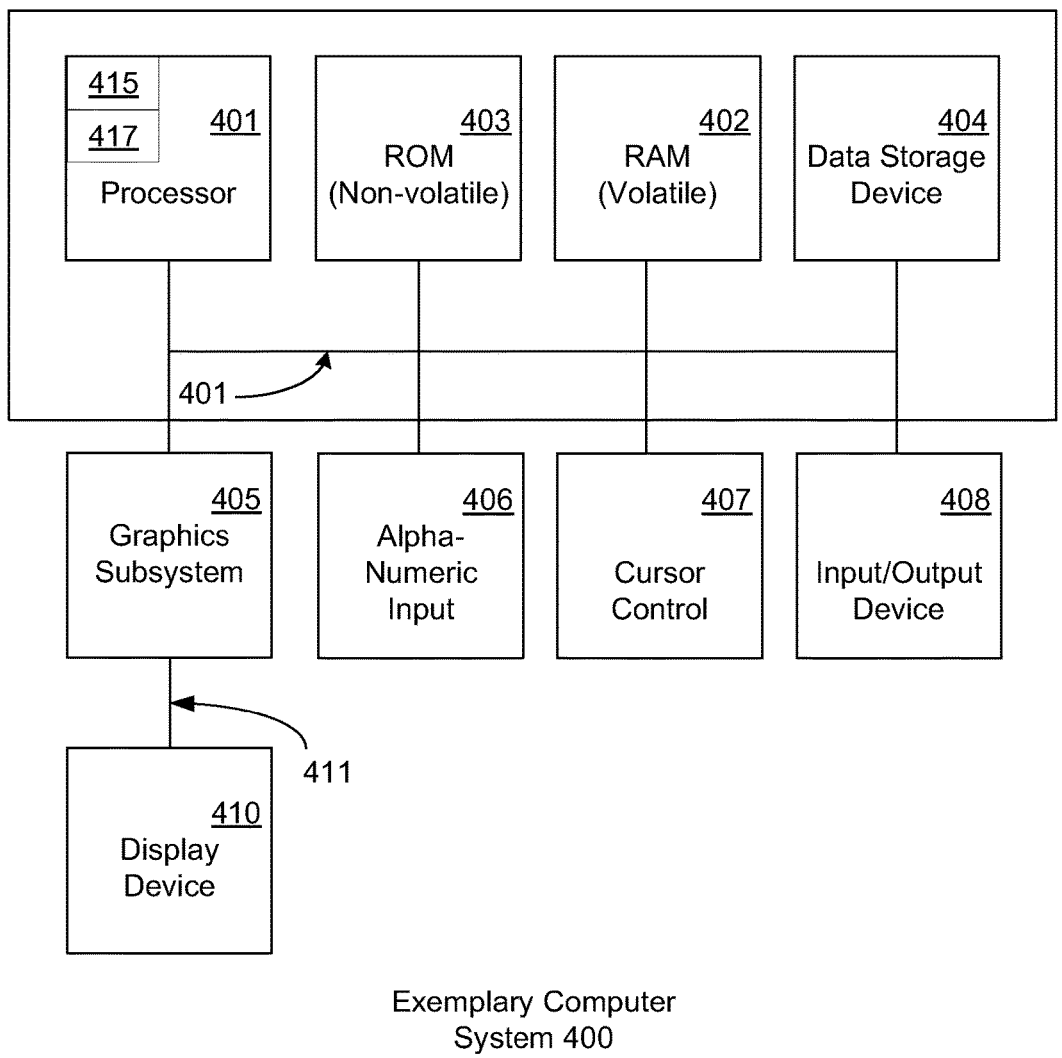
FIG. 4 depicts an example computing system, in accordance with embodiments of the present disclosure.

As presented in FIG. 4, an example system for implementing embodiments of the presently claimed subject matter is depicted. FIG. 4 includes a general purpose computing system environment, such as computing system 400. In its most basic configuration, computing system 400 typically includes at least one processing unit (CPU) 401 and memory, and an address/data bus 409 (or other interface) for communicating information. Depending on the exact configuration and type of computing system environment, memory may be volatile (such as RAM 402), non-volatile (such as ROM 403, flash memory, etc.) or some combination of the two. In an embodiment, the computing system 400 may be implemented as the physical hardware resource which may be used to host virtualized machines. In a further embodiment, computing system 400 may be one of many associated computing systems collectively managed as a cloud computing data center or network.

Computer system 400 may also comprise an optional graphics subsystem 405 for presenting information to the computer user, e.g., by displaying information on an attached display device 410, connected by a video cable 411. In an embodiment, process 100, 200, and/or 300 may be performed, in whole or in part, by a virtual machine hosted on computer system 400. In further embodiments, the CPU 401 of computer system 400 may further comprise a plurality of processing cores (e.g., processing core 415, 417). The CPU 401 and/or processing cores 415, 417 of the CPU may further include thermal diodes configured to measure the temperature of the CPU. In still further embodiments, the CPU may also feature a plurality of registers, including, but not limited to, programmable event counters, and timestamp counters.

Additionally, computing system 400 may also have additional features/functionality. For example, computing system 400 may also include additional storage (removable and/or non-removable) including, but not limited to, magnetic or optical disks or tape. Such additional storage is illustrated in FIG. 4 by data storage device 404. Computer storage media includes volatile and nonvolatile, removable and non-removable media implemented in any method or technology for storage of information such as computer readable instructions, data structures, program modules or other data. RAM 402, ROM 403, and data storage device 404 are all examples of computer storage media.

Computer system 400 also comprises an optional alphanumeric input device 406, an optional cursor control or directing device 407, and one or more signal communication interfaces (input/output devices, e.g., a network interface card) 408. Optional alphanumeric input device 406 can communicate information and command selections to central processor 401. Optional cursor control or directing device 407 is coupled to bus 409 for communicating user input information and command selections to central processor 401. Signal communication interface (input/output device) 408, also coupled to bus 409, can be a serial port. Communication interface 409 may also include wireless communication mechanisms. Using communication interface 409, computer system 400 can be communicatively coupled to other computer systems over a communication network such as the Internet or an intranet (e.g., a local area network), or can receive data (e.g., a digital television signal). In an embodiment, communication interface 409 may be used to communicate with a remotely located client to execute any of the methods described above thereby allowing a cloud computing consumer to verify the occupancy of the particular resource of a cloud computing infrastructure.

Although the subject matter has been described in language specific to structural features and/or processological acts, it is to be understood that the subject matter defined in the appended claims is not necessarily limited to the specific features or acts described above. Rather, the specific features and acts described above are disclosed as example forms of implementing the claims.

What is claimed is:

1. A method for determining CPU utilization in a cloud data center without directly accessing CPU usage monitor, the method comprising:

dynamically provisioning a first virtual machine servicing a client device communicably coupled to the first virtual machine for determining a utilization of a physical CPU, the first virtual machine hosted on a first physical machine corresponding to the physical CPU in the cloud data center, and the first physical machine hosting a plurality of additional virtual machines;

monitoring, from within the first virtual machine and by a hardware performance counter implemented on the first physical machine, a number of non-halted processing cycles of the physical CPU for a period of time, wherein the monitoring comprises launching, from the first virtual machine, a kernel driver configured to program and read the hardware performance counter;

determining, by the hardware performance counter, a total number of elapsed cycles for the period of time;

deriving, by the hardware performance counter, the utilization of the physical CPU by calculating a ratio of the number of non-halted processing cycles to the total number of elapsed cycles for the period of time as a percentage;

receiving, from the client device, a request to transfer a service provided by the first virtual machine from the first virtual machine to a second virtual machine hosted on a second physical machine in the cloud data center based on the utilization of the physical CPU to improve a quality of the service, the second physical machine being a less burdened machine than the first physical machine; and in response to receiving the request, transferring the service from the first virtual machine hosted on the first physical machine to the second virtual machine hosted on the second physical machine in the cloud data center.

2. The method according to claim 1, wherein the physical CPU comprises a plurality of registers.

3. The method according to claim 2, wherein the plurality of registers comprises a plurality of hardware performance counters.

4. The method according to claim 3, wherein monitoring the number of non-halted processing cycles of the physical CPU comprises programming the plurality of hardware performance counters to monitor non-halted cycles that occur in the physical CPU and corresponding to the first virtual machine during the period of time.

5. The method according to claim 4, wherein monitoring the number of non-halted processing cycles further comprises performing a call to the kernel to obtain an updated performance count.

6. The method according to claim 1, wherein determining a total number of elapsed cycles for the period of time comprises reading a timestamp counter comprised in the CPU.

7. The method according to claim 1, wherein the first virtual machine comprises a provisioned resource in a cloud computing infrastructure.

8. The method according to claim 1, wherein the first virtual machine comprises a provisioned server.

9. The method according to claim 1, wherein the plurality of additional virtual machines are managed via a hypervisor executing on the first physical machine, and the plurality of additional virtual machines are prevented from directly accessing the registers of the physical CPU of the first physical machine by the hypervisor.

10. A method for determining CPU utilization in a cloud data center without directly accessing CPU usage monitor, the method comprising:

dynamically provisioning a first virtual machine servicing a client device communicably coupled to the first virtual machine for determining a utilization of a physical CPU, the first virtual machine hosted on a first physical machine corresponding to the physical CPU in the cloud data center, and the first physical machine hosting a plurality of additional virtual machines;

determining, by a thermal diode associated with the first physical machine, a steady-state temperature corresponding to the physical CPU by generating a constant amount of workload at a desired level of CPU utilization to be performed by the physical CPU over a pre-determined period of time, and measuring a temperature of the physical CPU at the end of the pre-determined period of time;

measuring, by the thermal diode, a temperature difference between a current operating temperature of the physical CPU and a critical shutdown temperature of the physical CPU, wherein the measuring of the temperature difference comprises launching, from the first virtual machine, a kernel driver configured to read the thermal diode to determine the current operating temperature;

determining, by the first virtual machine, the utilization of the physical CPU by comparing the steady-state temperature to the temperature difference, wherein the temperature difference is translated to a level of CPU utilization based on the temperature difference being proportional to the level of CPU utilization;

receiving, from the client device, a request to transfer a service provided by the first virtual machine from the first virtual machine to a second virtual machine hosted on a second physical machine in the cloud data center based on the utilization of the physical CPU to improve a quality of the service, the second physical machine being a less burdened machine than the first physical machine; and in response to receiving the request, transferring the service from the first virtual machine hosted on the first physical machine to the second virtual machine hosted on the second physical machine in the cloud data center.

11. The method according to claim 10 wherein the physical CPU comprises a plurality of cores.

12. The method according to claim 11, wherein the physical CPU further comprises a plurality of thermal diodes, each respective thermal diode of the plurality of thermal diodes corresponding to a core of the plurality of cores.

13. The method according to claim 12, wherein measuring the temperature difference comprises querying a temperature diode of a core of the physical CPU for the current operating temperature.

14. The method according to claim 13, wherein each of the cores has a corresponding critical shutdown temperature, and wherein the current operating temperature is expressed as the temperature difference between the current operating temperature of a core of the physical CPU and the critical shutdown temperature corresponding to the core of the physical CPU.

15. The method according to claim 12, wherein the kernel driver is further configured to identify a specific core of the plurality of cores.

16. The method according to claim 15, wherein identifying a specific core of the plurality of cores is performed by reading a programmed interrupt controller ID of the physical CPU and executing a CPU ID instruction.

17. The method according to claim 12, wherein the kernel driver is configured to periodically read the plurality of thermal diodes to determine the current operating temperature.

18. The method according to claim 17, wherein determining the current operating temperature of the physical CPU further comprises: periodically reading the plurality of thermal diodes over a period of time to determine a plurality of operating temperatures of the physical CPU for the period of time; and averaging the plurality of operating temperatures, wherein the current operating temperature comprises the average of the plurality of operating temperatures.

19. The method according to claim 10, wherein measuring the steady-state temperature comprises generating a plurality of workloads to be performed by the CPU over a plurality of pre-determined periods of time; deriving a plurality of workload-temperature pairs corresponding to the plurality of workloads and the plurality of pre-determined periods of time; and estimating the CPU utilization from the plurality of workload-temperature pairs.

20. The method according to claim 19, wherein deriving a plurality of workload-temperature pairs corresponding to the plurality of workloads and the plurality of pre-determined periods of time comprises measuring a temperature of the CPU after the period of time corresponding to each workload of the plurality of workloads.

21. The method according to claim 19, wherein estimating the CPU utilization from the plurality of workload-temperature pairs comprises plotting the plurality of workload-temperature pairs and extrapolating a least-square line based on the plurality of workload-temperature pairs.

22. The method according to claim 19, wherein the plurality of workloads comprises a plurality of progressively increasing workloads.

23. The method according to claim 10, wherein the first virtual machine comprises a provisioned resource in a cloud computing infrastructure.

24. The method according to claim 10, wherein the first virtual machine comprises a provisioned server.

25. The method according to claim 10, further comprising:
characterizing, by the first virtual machine, a thermal behavior of the physical CPU based on the steady-state temperature and an additional steady state temperature of the CPU determined in association with an increased utilization; and
determining, by the first virtual machine, a next utilization of the physical CPU at a future time based on the thermal behavior.

26. The method according to claim 10, wherein determining the utilization of the physical CPU from the steady-state temperature and the temperature difference by the first virtual machine comprises calculating, by the first virtual machine, the utilization of the physical CPU as a function of the steady-state temperature and the temperature difference.

27. A non-transitory computer-readable storage medium coupled to one or more processors and having instructions stored thereon which, when executed by the one or more processors, cause the one or more processors to perform operations for determining CPU utilization in a cloud data center without directly accessing CPU usage monitor, the operations comprising:
dynamically provisioning a first virtual machine servicing a client device communicably coupled to the first virtual machine for determining a utilization of a physical CPU, the first virtual machine hosted on a first physical machine corresponding to the physical CPU in the cloud data center, and the first physical machine hosting a plurality of additional virtual machines;
monitoring, from within the first virtual machine and by a hardware performance counter implemented on the first physical machine, a number of non-halted processing cycles of the physical CPU for a period of time, wherein the monitoring comprises launching, from the first virtual machine, a kernel driver configured to program and read the hardware performance counter;
determining, by the hardware performance counter, a total number of elapsed cycles for the period of time;

deriving, by the hardware performance counter, the utilization of the physical CPU by calculating a ratio of the number of non-halted processing cycles to the total number of elapsed cycles for the period of time as a percentage;
receiving, from the client device, a request to transfer a service provided by the first virtual machine from the first virtual machine to a second virtual machine hosted on a second physical machine in the cloud data center based on the utilization of the physical CPU to improve a quality of the service, the second physical machine being a less burdened machine than the first physical machine; and in response to receiving the request, transferring the service from the first virtual machine hosted on the first physical machine to the second virtual machine hosted on the second physical machine in the cloud data center.

28. The non-transitory computer-readable storage medium according to claim 27, wherein the physical CPU comprises a plurality of registers.

29. The non-transitory computer-readable storage medium according to claim 28, wherein the plurality of registers comprises a plurality of hardware performance counters.

30. The non-transitory computer-readable storage medium according to claim 29, wherein monitoring the number of non-halted processing cycles of the physical CPU comprises programming the plurality of hardware performance counters to monitor non-halted cycles that occur in the physical CPU and corresponding to the first virtual machine during the period of time.

31. The non-transitory computer-readable storage medium according to claim 30, wherein monitoring the number of non-halted processing cycles further comprises performing a call to the kernel to obtain an updated performance count.

32. The non-transitory computer-readable storage medium according to claim 27, wherein determining a total number of elapsed cycles for the period of time comprises reading a timestamp counter comprised in the CPU.

33. The non-transitory computer-readable storage medium according to claim 27, wherein the first virtual machine comprises a provisioned resource in a cloud computing infrastructure.

34. The non-transitory computer-readable storage medium according to claim 27, wherein the first virtual machine comprises a provisioned server.

35. The non-transitory computer-readable storage medium according to claim 27, wherein the first physical machine hosts the plurality of additional virtual machines, the plurality of additional virtual machines are managed via a hypervisor executing on the first physical machine, and the plurality of additional virtual machines are prevented from directly accessing the registers of the physical CPU of the first physical machine by the hypervisor.

36. A non-transitory computer-readable storage medium coupled to one or more processors and having instructions stored thereon which, when executed by the one or more processors, cause the one or more processors to perform operations for determining CPU utilization in a cloud data center without directly accessing CPU usage monitor, the operations comprising:
dynamically provisioning a first virtual machine servicing a client device communicably coupled to the first virtual machine for determining a utilization of a physical CPU, the first virtual machine hosted on a first physical machine corresponding to the physical CPU in the cloud data center, and the first physical machine hosting a plurality of additional virtual machines;

determining, by a thermal diode associated with the first physical machine, a steady-state temperature corresponding to the physical CPU by generating a constant amount of workload at a desired level of CPU utilization to be performed by the physical CPU over a pre-determined period of time, and measuring a temperature of the physical CPU at the end of the pre-determined period of time;

measuring, by the thermal diode, a temperature difference between a current operating temperature of the physical CPU and a critical shutdown temperature of the physical CPU, wherein the measuring of the temperature difference comprises launching, from the first virtual machine, a kernel driver configured to read the thermal diode to determine the current operating temperature;

determining, by the first virtual machine, the utilization of the physical CPU by comparing the steady-state temperature to the temperature difference, wherein the temperature difference is translated to a level of CPU utilization based on the temperature difference being proportional to the level of CPU utilization;

receiving, from the client device, a request to transfer a service provided by the first virtual machine from the first virtual machine to a second virtual machine hosted on a second physical machine in the cloud data center based on the utilization of the physical CPU to improve a quality of the service, the second physical machine being a less burdened machine than the first physical machine; and in response to receiving the request, transferring the service from the first virtual machine hosted on the first physical machine to the second virtual machine hosted on the second physical machine in the cloud data center.

37. The non-transitory computer-readable storage medium according to claim 36, wherein the physical CPU comprises a plurality of cores.

38. The non-transitory computer-readable storage medium according to claim 37, wherein the physical CPU further comprises a plurality of thermal diodes, each respective thermal diode of the plurality of thermal diodes corresponding to a core of the plurality of cores.

39. The non-transitory computer-readable storage medium according to claim 38, wherein measuring the temperature difference comprises querying a temperature diode of a core of the physical CPU for the current operating temperature.

40. The non-transitory computer-readable storage medium according to claim 39, wherein each of the cores has a corresponding critical shutdown temperature, and wherein the current operating temperature is expressed as the temperature difference between the current operating temperature of a core of the physical CPU and the critical shutdown temperature corresponding to the core of the physical CPU.

41. The non-transitory computer-readable storage medium according to claim 38, wherein the kernel driver is further configured to identify a specific core of the plurality of cores.

42. The non-transitory computer-readable storage medium according to claim 41, wherein identifying a specific core of the plurality of cores is performed by reading a programmed interrupt controller ID of the physical CPU and executing a CPU ID instruction.

43. The non-transitory computer-readable storage medium according to claim 38, wherein the kernel driver is configured to periodically read the plurality of thermal diodes to determine the current operating temperature.

44. The non-transitory computer-readable storage medium according to claim 43, wherein determining the current operating temperature of the physical CPU further comprises: periodically reading the plurality of thermal diodes over a period of time to determine a plurality of operating temperatures of the physical CPU for the period of time; and averaging the plurality of operating temperatures, wherein the current operating temperature comprises the average of the plurality of operating temperatures.

45. The non-transitory computer-readable storage medium according to claim 36, wherein measuring the steady-state temperature comprises generating a plurality of workloads to be performed by the CPU over a plurality of pre-determined periods of time; deriving a plurality of workload-temperature pairs corresponding to the plurality of workloads and the plurality of pre-determined periods of time; and estimating the CPU utilization from the plurality of workload-temperature pairs.

46. The non-transitory computer-readable storage medium according to claim 45, wherein deriving a plurality of workload-temperature pairs corresponding to the plurality of workloads and the plurality of pre-determined periods of time comprises measuring a temperature of the CPU after the period of time corresponding to each workload of the plurality of workloads.

47. The non-transitory computer-readable storage medium according to claim 45, wherein estimating the CPU utilization from the plurality of workload-temperature pairs comprises plotting the plurality of workload-temperature pairs and extrapolating a least-square line based on the plurality of workload-temperature pairs.

48. The non-transitory computer-readable storage medium according to claim 45, wherein the plurality of workloads comprises a plurality of progressively increasing workloads.

49. The non-transitory computer-readable storage medium according to claim 36, wherein the first virtual machine comprises a provisioned resource in a cloud computing infrastructure.

50. The non-transitory computer-readable storage medium according to claim 36, wherein the first virtual machine comprises a provisioned server.

51. The non-transitory computer-readable storage medium according to claim 36, further comprising:
characterizing, by the first virtual machine, a thermal behavior of the physical CPU based on the steady-state temperature and an additional steady state temperature of the CPU determined in association with an increased utilization; and
determining, by the first virtual machine, a next utilization of the physical CPU at a future time based on the thermal behavior.

52. The non-transitory computer-readable storage medium according to claim 36, wherein determining the utilization of the physical CPU from the steady-state temperature and the temperature difference by the first virtual machine comprises calculating, by the first virtual machine, the utilization of the physical CPU as a function of the steady-state temperature and the temperature difference.

* * * * *

UNITED STATES PATENT AND TRADEMARK OFFICE
CERTIFICATE OF CORRECTION

PATENT NO. : 9,749,207 B2  
APPLICATION NO. : 14/283501  
DATED : August 29, 2017  
INVENTOR(S) : Huan Liu Page 1 of 1

It is certified that error appears in the above-identified patent and that said Letters Patent is hereby corrected as shown below:

On the Title Page

Column 2, Item (56) (Other Publications), Entry 1, Line 2, before "guru3d.com/" insert -- http.//www. --.

Column 2, Item (74) (Attorney, Agent, or Firm), Line 1, delete "Richarson" and insert -- Richardson --, therefor.

Signed and Sealed this  
Twenty-sixth Day of March, 2019

Andrei Iancu  
*Director of the United States Patent and Trademark Office*